United States Patent [19]
Nowak

[11] Patent Number: 5,497,576
[45] Date of Patent: Mar. 12, 1996

[54] SNAKE TRAP

[76] Inventor: Martin Nowak, 1160 Oak Creek, Birmingham, Ala. 35215

[21] Appl. No.: 260,006
[22] Filed: Jun. 15, 1994
[51] Int. Cl.$^6$ .................................................. A01K 23/00
[52] U.S. Cl. .................................................. 43/58; 43/114
[58] Field of Search .......................... 43/58, 7, 10, 114, 43/121, 115, 116, 117

[56] References Cited

U.S. PATENT DOCUMENTS

| | | | |
|---|---|---|---|
| 4,425,731 | 1/1984 | Orlando | 43/58 |
| 4,438,584 | 3/1984 | Baker et al. | 43/58 |
| 4,449,316 | 5/1984 | Moorhead | 43/58 |

FOREIGN PATENT DOCUMENTS

| | | | |
|---|---|---|---|
| 3127234 | 1/1983 | Germany | A01M 23/00 |

*Primary Examiner*—Maurina T. Rachuba
*Assistant Examiner*—Chuck Y. Mah
*Attorney, Agent, or Firm*—Veal & Marsh

[57] ABSTRACT

An adhesive trap for capturing snakes. The trap includes a flat base and means for securing the base into position against a wall. A specially shaped non-adhesive crawling surface is adjacent the wall, and permits a snake to crawl onto the trap without encountering any adhesive. The crawling surface diminishes in width from its entry end to its terminal end, and is surrounded along its outer boundary by an adhesive capture area. The capture area includes a high-strength adhesive, such as that used in rodent glue traps. The adhesive-free crawling surface narrows sufficiently near its terminal end to cause a snake to throw a loop of its body laterally into the adhesive, either in the process of crawling forward, or when the snake attempts to turn around or pull back from the adhesive at the end of the crawling surface. The snake will be securely trapped when it pushes its chin down into the adhesive in an attempt to free its neck or throws a loop of its body laterally onto the adhesive area.

26 Claims, 4 Drawing Sheets

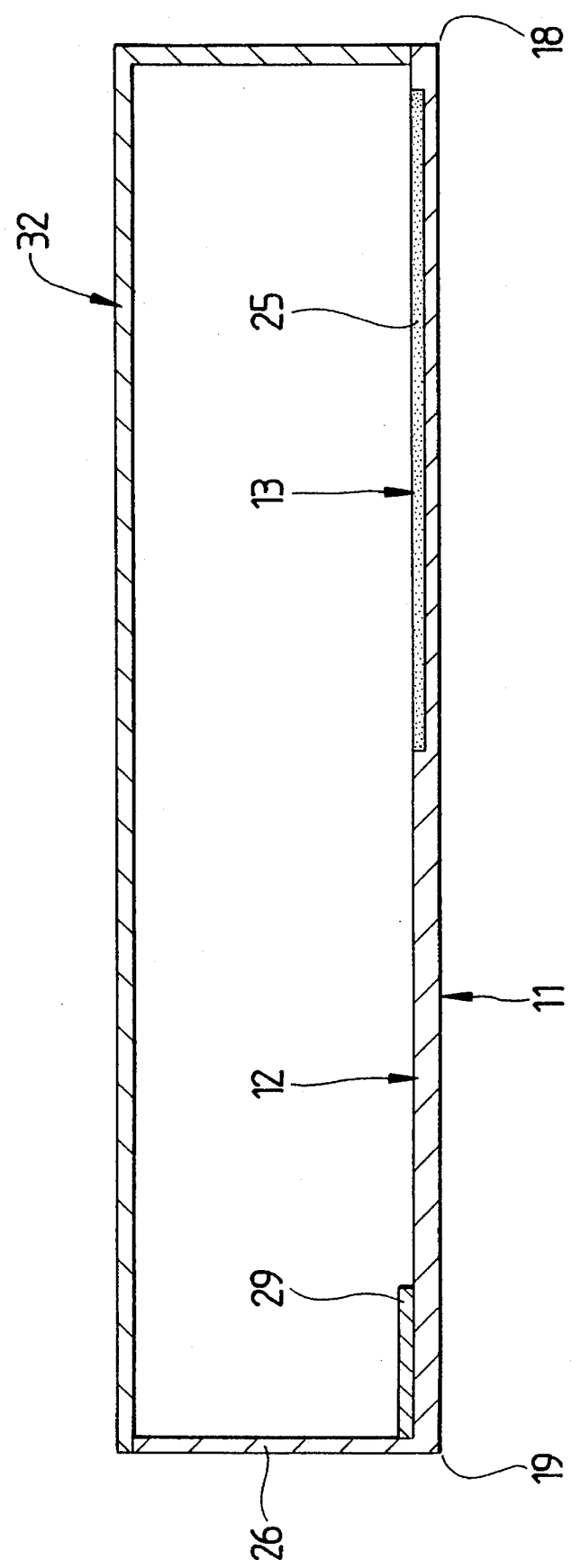

SNAKE TRAP

FIELD OF THE INVENTION

The present invention relates to pest control. More particularly, the present invention relates to an apparatus for trapping unwanted pests. Still more particularly, the present invention relates to an adhesive trap designed specifically for trapping snakes.

BACKGROUND OF THE INVENTION

Traps using adhesives for trapping rodents are well known in the art. A typical adhesive rodent trap comprises a plastic tray which is filled with a high-strength adhesive. Such traps are placed in areas frequented by rodents. When a rodent runs onto the tray, it is securely held in place by the adhesive. Such a trap is disclosed in German patent number DE 3,127,234, Jan. 20, 1983. The adhesive trays used for trapping rodents are ineffective for trapping snakes, due to the behavioral characteristics of snakes. Snakes tend to crawl with their heads slightly elevated. If a snake were to encounter a rodent adhesive trap, it would first sense the presence of the trap when its neck, at a point approximately three or four inches behind its head, touches the edge of the trap. The snake will hesitate momentarily, then either avoid capture by crawling around the trap or crawl forward onto the trap. When its neck first engages the adhesive and becomes stuck, the snake will tend to use the rear portion of its body to gain leverage to pull back from the trap. The snake may thrash its body from side to side in its attempt to pull free, but it is unlikely that a snake will throw a loop of its body forward onto the adhesive. The snake may succeed in freeing itself from the adhesive because only a small portion of its body contacts the adhesive.

SUMMARY OF THE PRESENT INVENTION

With the foregoing in mind, the principal object of the present invention is to provide a reliable means for trapping snakes.

Another object of the present invention is to provide a snake trap that is easily installed.

Yet another object of the invention is to provide a snake trap which is relatively easy and inexpensive to manufacture.

These and other objects of the present invention are accomplished through the use of an adhesive snake trap that incorporates a specially shaped non-adhesive crawling surface which takes into account the behavioral characteristics of snakes and uses those characteristics to ensure that a snake that encounters the trap will be caught on the adhesive surface of the trap.

Snakes exhibit a number of common behavioral characteristics that are considered in the design of the present invention. First, snakes tend to crawl against objects, such as walls, logs or rocks. If a snake ventures into an area, it will ordinarily choose a route along the walls. Secondly, snakes tend to crawl with their heads slightly elevated. Additionally, in the most common methods of crawling, there is a significant lateral component to the snake's movement. In one method of snake locomotion, known as the serpentine crawl, a snake propels its body forward in a series of side-to-side S-shaped undulations, gaining leverage to push its body along the ground by pressing its sides against surface irregularities. In another type of movement, referred to as the concertina crawl, the snake maintains a roughly triangular shape, widening from its head rearwardly. The snake compresses the rear portion of its body into a series of side-to-side loops, then thrusts its head forward. It grips the surface with the front portion of its body, then pulls the rear portion forward to prepare for another thrust forward. The scales and musculature of snakes are such that both individual scales and groups of scales will grasp any surface irregularity to assist in locomotion. If the head of a snake is restrained, the snake will thrash the remainder of its body from side to side in an effort to gain leverage to free its head. If a portion of the body is restrained, there is a strong tendency for the remainder of the body to rapidly "pull" to the site of the restraint.

The present invention is designed to use these behavioral characteristics to its advantage. The invention is designed to be placed against an object or wall, and includes a non-adhesive crawling surface which generally diminishes in width from an entry end to a terminal end. The non-adhesive crawling surface is adjacent to an adhesive capture area. The crawling area is of sufficient initial width and length to allow a snake to crawl fully onto the crawling surface without encountering any adhesive. Near the terminal end of the crawling surface, however, the adhesive-free crawling surface narrows sufficiently to cause a snake to throw a loop of its body laterally into the adhesive, either in the process of crawling forward, or when the snake attempts to turn around or pull back from the adhesive at the end of the crawling surface. The snake will be securely trapped when it pushes its chin down into the adhesive in an attempt to free its neck or throws a loop of its body laterally onto the adhesive area.

BRIEF DESCRIPTION OF THE DRAWINGS

The foregoing objects and advantages of the present invention will be more readily understood by one skilled in the art by referring to the following detailed description of a preferred embodiment and to the accompanying drawings which form a part of this disclosure, and wherein:

FIG. 7 is a sectional view of the present invention showing the capture area in the form of a basin and a cover for enclosing the trap.

DESCRIPTION OF THE PREFERRED EMBODIMENT

Figure 1:
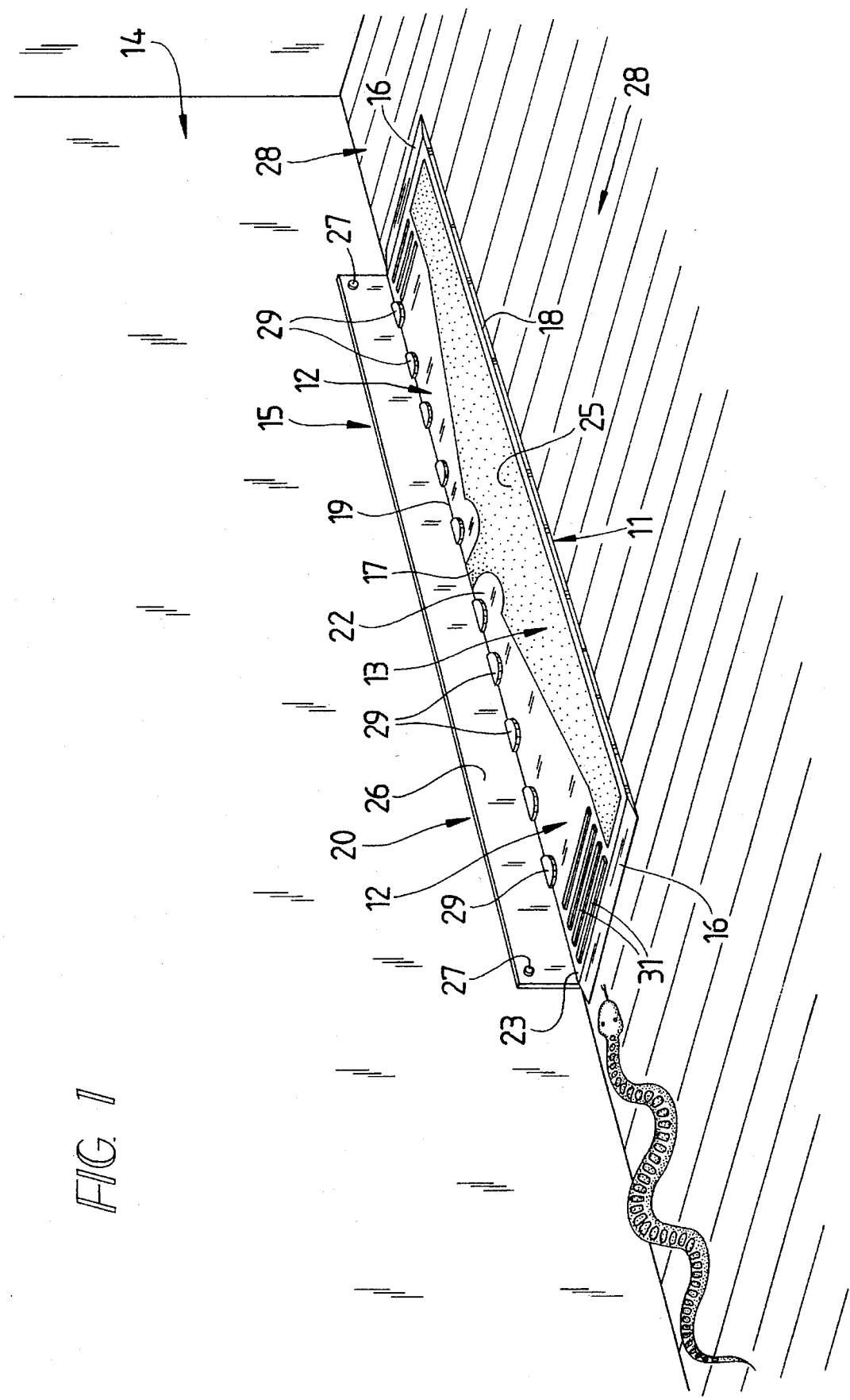
FIG. 1 is a perspective view of the preferred embodiment, showing a bi-directional trap.
Figure 2:
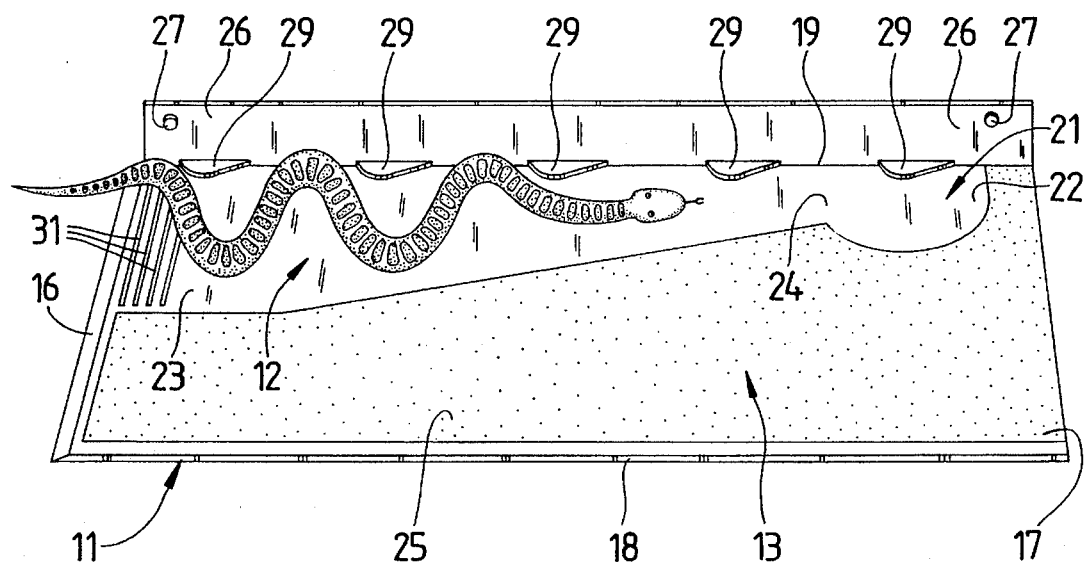
FIG. 2 is a perspective view of the present invention, showing a snake crawling within the crawling area of the trap.
Figure 3:
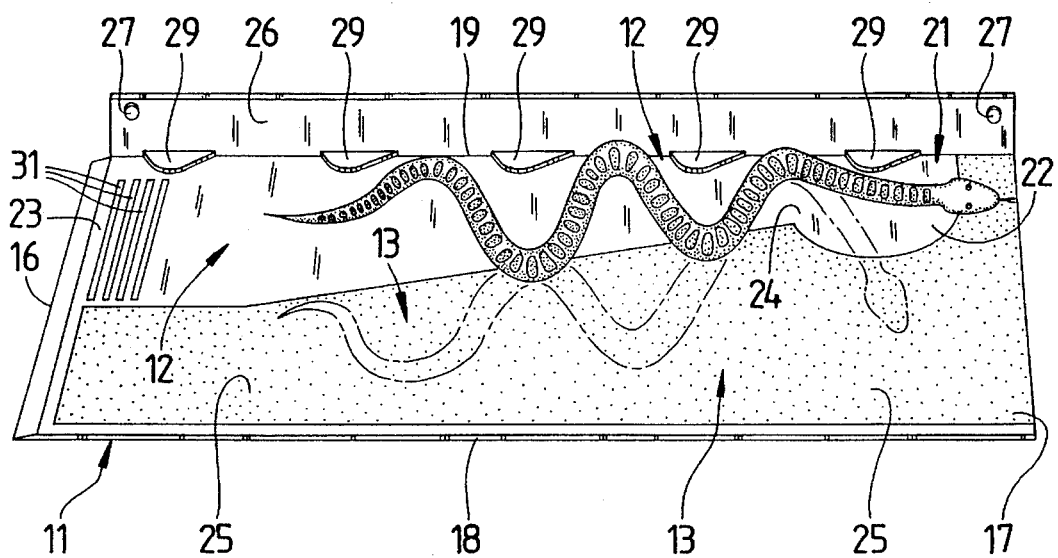
FIG. 3 is a perspective view of the present invention, showing the snake as it reaches the terminal end of the crawling area, with dotted lines representing an expected end position of the snake on the adhesive capture area.

As shown in FIGS. 1–3, the preferred embodiment comprises an elongated rectangular base 11 having a crawling area 12 and a capture area 13 defined thereon. The trap is designed to be placed against a wall 14 to take advantage of the natural tendency of snakes to crawl along the wall. FIG. 1 illustrates a bi-directional trap wherein the crawling area 12 of the second side 15 is a mirror image of the crawling area 12 of the first side 20 of the trap. It will capture a snake approaching it from either direction along the wall. Although a bi-directional trap is preferable to a trap having the capability to capture snakes approaching from a single direction, the invention includes single direction traps such as those shown in FIGS. 2 and 3. As shown in FIG. 2, the base 11 has a beveled entry edge 16, a forward area 17, an outer edge 18, and a wall edge 19. Although the beveled edge may provide less of an obstacle to an oncoming snake, it is not necessary if the base 11 is sufficiently thin so as not to deter a snake from crawling over its edge. The crawling area 12 generally diminishes in width from the entry edge 16 of the base toward the forward area 17 of the base. The crawling area 12 does not contain any adhesive substance and extends from a corner of the base so that a portion of the wall edge 19 forms one of its boundaries and an adjacent segment of the entry edge 16 forms another of its boundaries. Its width at the entry edge 16 of the base and its length are sufficient so that a snake traveling along the adjacent wall 14 can crawl fully onto the trap before it encounters any adhesive substance. In the preferred embodiment, the crawling area 12 tapers from its entry end 23 adjacent the entry edge 16 toward its terminal end 22 adjacent the forward area 17 of the base 11, and has an enlarged semi-circular area 21 at its terminal end 22. The enlarged semi-circular area 21 causes the snake to perceive that it has enough room to turn around completely and avoid the adhesive in the capture area 13. The neck 24 of the crawling area 12, however, is sufficiently narrow to inhibit the snake's ability to turn around without becoming entrapped.

Figure 4:
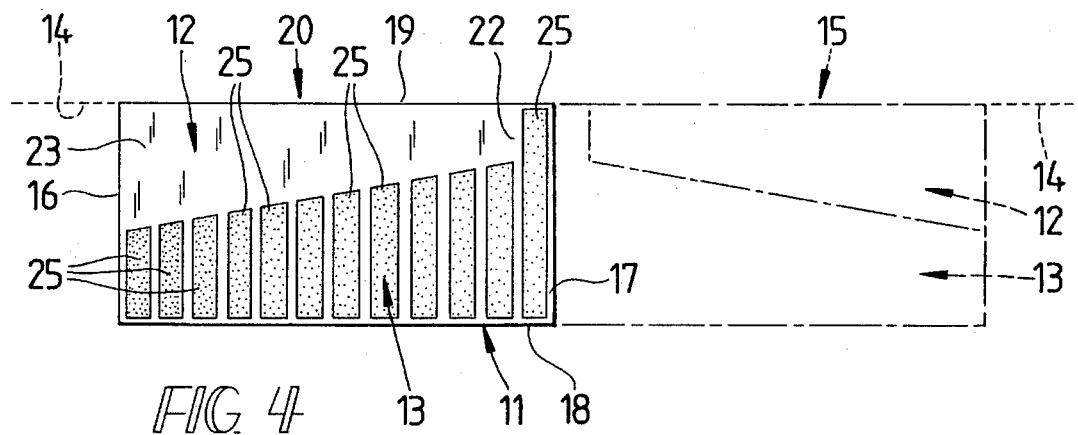
FIG. 4 is a top plan view of an alternate embodiment of the present invention, showing an alternate configuration for the crawling and capture areas of the trap and showing the adhesive positioned in strips within the capture area. The dotted lines represent the configuration of this embodiment when used as a bi-directional trap.
Figure 5:
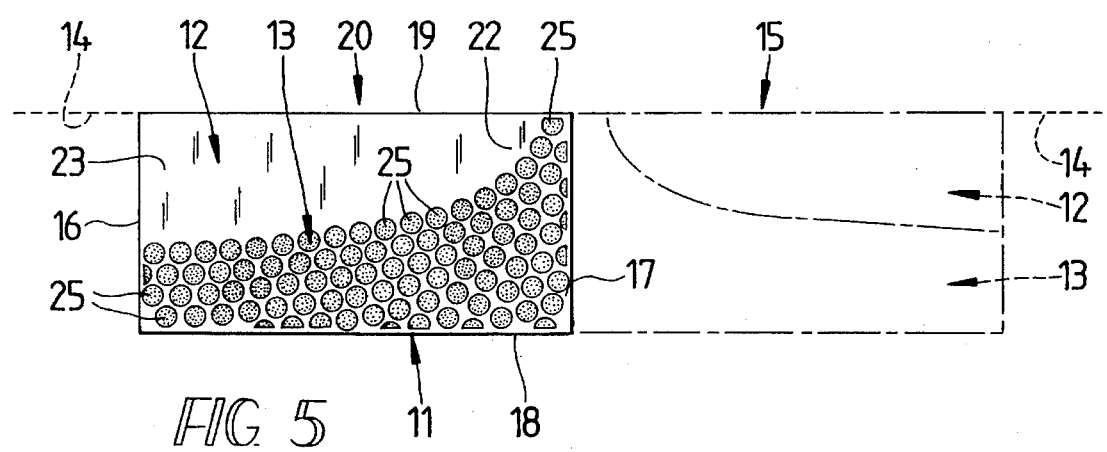
FIG. 5 is also a top plan view of an alternate embodiment of the present invention, showing an alternate configuration for the crawling and capture areas of the trap, and showing the adhesive positioned in dots within the capture area. The dotted lines represent the configuration of this embodiment when used as a bi-directional trap.
Figure 6:
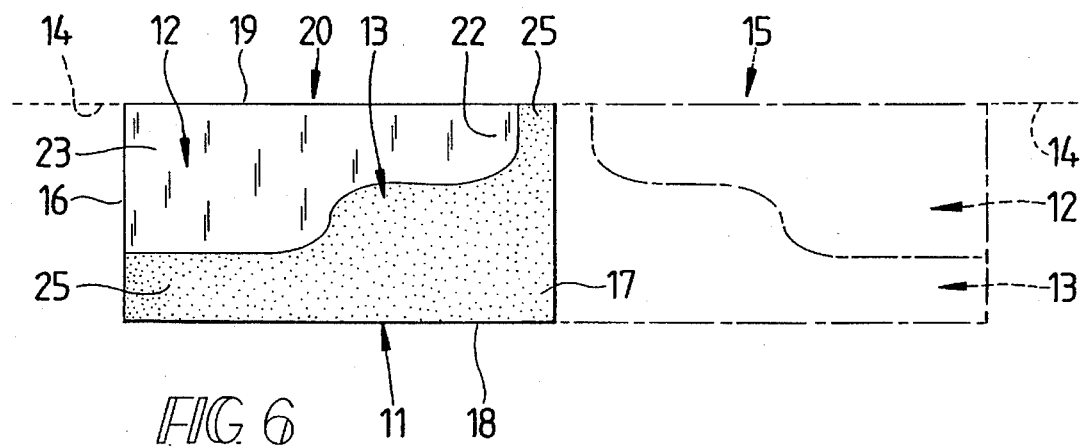
FIG. 6 is also a top plan view of an alternate embodiment of the present invention, showing an alternate configuration for the crawling and capture areas of the trap. The dotted lines represent the configuration of this embodiment when used as a bi-directional trap.

An adhesive 25 is positioned on the capture area 13 of the base 11. Preferentially the capture area 13 is a basin or the like such that the adhesive substance may be placed therein without extending above the surface of the crawling area 12 as shown in FIG. 7. This may be accomplished by forming the base from a moldable plastic as is well known in the art or by stamping the base from cardboard or other suitable material such that a depression is formed for receiving the adhesive substance. The adhesive may cover the entire area, as shown in FIGS. 1–3 and 6, or it may cover only a portion of the area as shown in FIGS. 4 and 5. In FIG. 4, the adhesive 25 is positioned in strips over the capture area 13. In FIG. 5, the adhesive 25 is placed in dots over the capture area 13. It is not necessary that the entire capture area be covered with adhesive, as long as there is sufficient coverage to ensure that a portion of the snake's body will contact an adhesive-coated area. The adhesive must be of sufficient strength to hold the snake in place when the snake touches the adhesive. Commercially available glues used in rodent traps may be used in the present invention. Alternatively, strips of tape having adhesive on both sides may be placed on the capture area. The adhesive on the side of the tape strip that faces upwardly must again be of sufficient strength to grasp a snake's body securely. If the adhesive on the side of the tape strip that is next to the base is a low-strength adhesive that will release when pressure is applied, the tape will wrap around the snake's body as the snake moves, entangling the snake and preventing further movement.

In the preferred embodiment, a flap 26 is attached to and extends upwardly from the wall edge 19 of the base 11. To hold the trap in position, the flap 26 may be attached to the adjacent wall 14 by one or more tacks 27. Alternatively, the flap 26 may be nailed to the wall 14, or it may be secured to the wall by double-sided tape or other adhesive. Alternate means of holding the trap in position against the wall include placing double-sided tape or other adhesive between the base 11 and the surface 28 on which it rests and tacking or nailing the base 11 to the surface 28. The trap should be secured in position to ensure that a snake cannot push the trap away from the wall and thereby gain additional room in which to maneuver.

To aid a snake in moving toward the terminal end 22 of the crawling area 12, one or more upwardly-extending protrusions 29 may be positioned within the crawling area. The protrusions need only be of sufficient height to enable a snake to grasp the protrusion with an individual scale or group of scales. Since the snake will push its body away from a protrusion, the preferable location is along the boundary of the crawling area formed by the wall edge 19 of the base 11, so that the snake will be pushing its body toward the adhesive capture area. Because a snake's scales are capable of grasping very small surface irregularities, abraded areas along the boundary of the crawling area formed by the wall edge 19 would also serve to provide traction for the snake. Further traction may be provided by positioning one or more small ridges 31 across the entry end 23 of the crawling area 12. In the preferred embodiment, the ridges 31 are positioned perpendicular to the wall 14 to aid the snake in traveling along the wall.

Although it is not necessary to the operation of the trap, a cover 32 may be added to create a "tunnel" as an enticement for a snake as shown in FIG. 7. The cover prevents dust from settling on the adhesive and thereby descreasing its tackiness; it further serves to decrease the likelihood that pets and children will come into contact with the adhesive or a captured snake. Additionally, the trap may be baited or scented with a substance such as mouse urine to lure a snake onto the trap.

While I have shown my invention in several embodiments, it will be obvious to those skilled in the art that it is not so limited but is susceptible of various changes and modifications without departing from the spirit thereof.

Having set forth the nature of the present invention, what is claimed is:

1. An apparatus for trapping a snake, comprising:
   (a) a substantially flat base, having an entry edge, a wall edge, a forward area and an outer edge;
   (b) means for affixing said base in position such that said wall edge of said base is adjacent a wall;
   (c) an adhesive of sufficient strength to hold said snake, said adhesive positioned on a capture area of said base;
   (d) a crawling area adjacent said wall edge, defined by the area of said base not included within said capture area, said crawling area generally diminishing in width from said entry edge of said base toward said forward area of said base.

2. An apparatus as defined in claim 1, further comprising means, positioned on said crawling area, for providing traction to said snake.

3. An apparatus as defined in claim 2, wherein said traction-providing means comprises a plurality of protrusions, extending upwardly from said crawling area.

4. An apparatus as defined in claim 2, wherein said traction-providing means comprises a plurality of roughened areas.

5. An apparatus as defined in claim 2, wherein said entry edge is beveled.

6. An apparatus as defined in claim 2, wherein said traction-providing means comprises a plurality of ridges, positioned on said crawling area proximal said entry edge of said base, said ridges being substantially perpendicular to said wall.

7. An apparatus as defined in claim 6, wherein said base-affixing means comprises:
   (a) a flap, attached to and extending upwardly from said wall edge of said base; and
   (b) means for fastening said flap to said wall.

8. An apparatus as defined in claim 7, wherein said flap-fastening means comprises a tack, extending through said flap and into said wall.

9. An apparatus as defined in claim 8, wherein said flap has a top edge and extends the length of said base, and further comprising a cover, extending from said outer edge of said base to said top edge of said flap, such that said base, said flap and said cover define a tunnel.

10. An apparatus as defined in claim 1 wherein said base-affixing means comprises:
    (a) a flap, attached to and extending upwardly from said wall edge of said base; and
    (b) means for fastening said flap to said wall.

11. An apparatus as defined in claim 10, wherein said flap-fastening means comprises a tack, extending through said flap and into said wall.

12. An apparatus as defined in claim 10, wherein said flap-fastening means comprises an adhesive substance positioned intermediate said flap and said wall.

13. An apparatus as defined in claim 1, wherein said base rests upon a surface and wherein said base-affixing means comprises an adhesive substance positioned intermediate said base and said surface.

14. An apparatus as defined in claim 1, wherein said base rests upon a surface and wherein said base-affixing means comprises a tack extending through said base and into said surface.

15. A snake trap, for placement on a surface against a wall comprising:
    (a) a substantially flat, thin base;
    (b) a capture area defined thereon;
    (c) an adhesive substance, positioned on said capture area;
    (d) a crawling surface, generally diminishing in width from an entry end to a terminal end of said crawling surface, said crawling surface having a first boundary defined by said wall and an outer boundary defined by said capture area; and
    (e) means for affixing said base such that it maintains its position relative to said wall.

16. A snake trap as defined in claim 15, wherein a portion of said capture area is adjacent said wall and adjacent said terminal end of said crawling surface.

17. A snake trap as defined in claim 16, further comprising means positioned within said crawling surface for providing traction to a snake.

18. A snake trap as defined in claim 17, wherein said traction-providing means comprises at least one protrusion extending upwardly from said crawling surface.

19. A snake trap as defined in claim 18, wherein said base-affixing means comprises:
    (a) a flap, extending upwardly from said base and adjacent said wall; and
    (b) means for securing said flap to said wall.

20. A snake trap as defined in claim 19, wherein said flap-securing means comprises a tack, extending through said flap and into said wall.

21. A snake trap as defined in claim 17, wherein said traction-providing means comprises at least one indentation extending downwardly from said crawling surface.

22. A snake trap as defined in claim 18, further comprising a scented substance, deposited along said crawling surface to lure a snake along said crawling surface toward said terminal end of said crawling surface.

23. A snake trap as defined in claim 18, wherein said base-affixing means comprises a tape strip having adhesive on both sides thereof, said tape strip positioned intermediate said base and the surface upon which said trap is placed.

24. A snake trap as defined in claim 18, wherein said base-affixing means comprises a tack extending through said base and into the surface upon which said trap is placed.

25. A snake trap, for placement on a surface against a wall comprising:
    (a) a substantially flat, thin base;
    (b) a capture area defined thereon;
    (c) an adhesive substance, positioned on said capture area; and
    (d) a crawling surface, generally diminishing in width from an entry end to a terminal end of said crawling surface, said crawling surface having a first boundary defined by said wall and an outer boundary defined by said capture area.

26. A snake trap, for placement against an object, comprising:
    (a) a substantially flat, thin base;
    (b) a capture area defined thereon;
    (c) an adhesive substance, positioned on said capture area;
    (d) a crawling surface, generally diminishing in width from an entry end to a terminal end of said crawling surface, said crawling surface having a first boundary adjacent said object and an outer boundary defined by said capture area.

* * * * *

UNITED STATES PATENT AND TRADEMARK OFFICE
CERTIFICATE OF CORRECTION

PATENT NO. : 5,497,576
DATED : March 12, 1996
INVENTOR(S) : Martin Nowak

It is certified that error appears in the above-indentified patent and that said Letters Patent is hereby corrected as shown below:

Column 6, claim 22, line 1, delete "18" and substitute --17--.

Signed and Sealed this

Twenty-fifth Day of June, 1996

Attest:

BRUCE LEHMAN

*Attesting Officer*   *Commissioner of Patents and Trademarks*